United States Patent
Kent et al.

(10) Patent No.: US 9,094,062 B2
(45) Date of Patent: *Jul. 28, 2015

(54) METHOD AND SYSTEM FOR IMPLEMENTING A SINGLE WEIGHT (SW) SINGLE CHANNEL (SC) MIMO SYSTEM

(71) Applicant: Broadcom Corporation, Irvine, CA (US)

(72) Inventors: Mark Kent, Vista, CA (US); Vinko Erceg, Cardiff, CA (US); Uri Landau, San Diego, CA (US); Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/785,779

(22) Filed: Mar. 5, 2013

(65) Prior Publication Data

US 2013/0182796 A1    Jul. 18, 2013

Related U.S. Application Data

(63) Continuation of application No. 11/173,689, filed on Jun. 30, 2005, now Pat. No. 8,532,019.

(60) Provisional application No. 60/616,894, filed on Oct. 6, 2004.

(51) Int. Cl.
H04W 4/00    (2009.01)
H04B 7/04    (2006.01)
H04B 7/08    (2006.01)

(52) U.S. Cl.
CPC ............ H04B 7/0413 (2013.01); H04B 7/0857 (2013.01)

(58) Field of Classification Search
CPC .............................. H01Q 3/2605; H04W 4/00
USPC ................ 455/139, 562.1, 575.1, 67.14, 522;
370/208, 343, 350, 335, 342, 334;
375/347, 130, 316; 343/893
See application file for complete search history.

(56) References Cited

U.S. PATENT DOCUMENTS 4,397,036 A    8/1983  Hirade et al.
2004/0105489 A1   6/2004  Kim et al.
(Continued)

FOREIGN PATENT DOCUMENTS

EP    1447926 A    8/2004
WO    WO 2004/001893    12/2003

OTHER PUBLICATIONS

Jan Mietzner and Peter A. Hoeher, University of Kiel, Adaptive Antennas and MIMO Systems for Wireless Communications, *Boosting the Performance of* Wireless Communications *Systems: Theory and Practice of Multiple-Antenna Techniques*, IEEE Communications Magazine, Oct. 2004 pp. 40-47.

(Continued)

*Primary Examiner* — Kiet Doan
(74) *Attorney, Agent, or Firm* — Sterne, Kessler, Goldstein & Fox P.L.L.C.

(57) ABSTRACT

Methods and systems for processing signals in a receiver are disclosed herein and may comprise generating at least one control signal that may be utilized to control a first received signal. A phase of the first received signals may be adjusted via the generated control signal so that the phase of the first received signal may be equivalent to a phase of a second received signal, where the phase of the first signal may be adjusted within a processing path used to process the first received signal. An amplitude of the first received signal may be adjusted via the generated control signal so that the amplitude of the first received signal may be equivalent to an amplitude of a second received signal, where the amplitude of the first signal is adjusted within the processing path used to process the first received signal.

27 Claims, 8 Drawing Sheets

(56) References Cited

U.S. PATENT DOCUMENTS

| | | | |
|---|---|---|---|
| 2004/0125899 A1* | 7/2004 | Li et al. | 375/347 |
| 2005/0078649 A1* | 4/2005 | Tehrani et al. | 370/343 |
| 2005/0243898 A1 | 11/2005 | Reznik et al. | |

OTHER PUBLICATIONS

Simon Haykin, McMaster University; Matlini Sellalhurai, Yvo De Jong, and Tricia Willink, Communications Research Centre Canada, Adaptive Antennas and MIMO Systems for Wireless Communications, *Turbo-MIMO for Wireless* Communications, IEEE Communications Magazine, Oct. 2004, pp. 48-53.

David J. Love, Purdue University, Robert W. Heath, Jr., University of Texas at Austin and Wiroonsak Santipach and Michael L. Honig, Northwestern University; Adaptive Antennas and MIMO Systems for Wireless Communications, *What is the Value of Limited Feedback for MIMO* Channels? IEEE Communications Magazine, Oct. 2004, pp. 54-59.

Quentin H. Spencer. Distribution Control Systems, Inc., .Christian B. Peel, Swiss Federal Institute of Technology, A. Lee Swindlehurst. Brigham Young University, Martin Haardt, Ilmenau University of Technology, Adaptive Antennas and MIMO Systems for Wireless Communications. *An Introduction to the Multi-User MIMO Downlink*, IEEE Communications Magazine, Oct. 2004, pp. 60-67.

Shahab Sanayei and Aria Nosratinia, University of Texas of Dallas, Adaptive Antennas and MIMO Systems for Wireless Communications *Antenna Selection in MIMO* Systems, IEEE Communications Magazine, Oct. 2004, pp. 68-73.

Aria Nosratinia, University of Texas, Dallas, Todd E. Hunter, Nortel Networks, Ahmadreza Hedayat, University of Texas.Dallas.*Cooperative Communication in Wireless Networks*, IEEE Communication Magazine, Oct. 2004, pp. 74-80.

\* cited by examiner ly, certain embodiments of the invention relate to a method and system for implementing a single weight (SW) single channel (SC) multiple-input multiple-output (MIMO) system.

METHOD AND SYSTEM FOR IMPLEMENTING A SINGLE WEIGHT (SW) SINGLE CHANNEL (SC) MIMO SYSTEM

CROSS-REFERENCE TO RELATED APPLICATIONS

Cross-Reference to Related Applications

This application is a continuation of U.S. patent application Ser. No. 11/173,689, filed Jun. 30, 2005, which claims benefit of U.S. Provisional Patent Application No. 60/616,894, filed Oct. 6, 2004, which are both incorporated herein by reference in their entireties.

This application is related to the following applications, each of which is incorporated herein by reference in its entirety for all purposes:

U.S. patent application Ser. No. 11/173,870, filed Jun. 30, 2005;
U.S. patent application Ser. No. 11/174,303, filed Jun. 30, 2005;
U.S. patent application Ser. No. 11/173,502, filed Jun. 30, 2005;
U.S. patent application Ser. No. 11/173,871, filed Jun. 30, 2005;
U.S. patent application Ser. No. 11/173,964, filed Jun. 30, 2005;
U.S. patent application Ser. No. 11/173,252, filed Jun. 30, 2005;
U.S. patent application Ser. No. 11/174,252, filed Jun. 30, 2005;
U.S. patent application Ser. No. 11/172,756, filed Jun. 30, 2005;
U.S. patent application Ser. No. 11/173,305, filed Jun. 30, 2005;
U.S. patent application Ser. No. 11/172,759, filed Jun. 30, 2005;
U.S. patent application Ser. No. 11/173,304, filed Jun. 30, 2005;
U.S. patent application Ser. No. 11/173,129, filed Jun. 30, 2005;
U.S. patent application Ser. No. 11/172,779, filed Jun. 30, 2005;
U.S. patent application Ser. No. 11/172,702, filed Jun. 30, 2005;
U.S. patent application Ser. No. 11/173,727, filed Jun. 30, 2005;
U.S. patent application Ser. No. 11/173,726, filed Jun. 30, 2005;
U.S. patent application Ser. No. 11/172,781, filed Jun. 30, 2005;
U.S. patent application Ser. No. 11/174,067, filed Jun. 30, 2005;
U.S. patent application Ser. No. 11/173,854, filed Jun. 30, 2005;
U.S. patent application Ser. No. 11/173,911, filed Jun. 30, 2005; and
U.S. patent application Ser. No. 11/174,403, filed Jun. 30, 2005.

FIELD OF THE INVENTION

Certain embodiments of the invention relate to processing received radio frequency (RF) signals. More specifically, certain embodiments of the invention relate to a method and system for implementing a single weight (SW) single channel (SC) multiple-input multiple-output (MIMO) system.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

FIG. 1a is a technology timeline indicating evolution of existing WCDMA specification to provide increased downlink throughput. Referring to FIG. 1a, there is shown data rate spaces occupied by various wireless technologies, including General Packet Radio Service (GPRS) 100, Enhanced Data rates for GSM (Global System for Mobile communications) Evolution (EDGE) 102, Universal Mobile Telecommunications System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel.

In some instances, HSDPA may provide a two-told improvement in network capacity as well as data speeds up to five times (over 10 Mbit/s) higher than those in even the most advanced 3G networks. HSDPA may also shorten the roundtip time between network and terminal, while reducing variances in downlink transmission delay. These performance advances may translate directly into improved network performance and higher subscriber satisfaction. Since HSDPA is an extension of the WCDMA family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals can be combined in several ways, from which maximal ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI and inter-path interference (IPI). The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

To combat MAI, linear interference suppression algorithms can be utilized, which are based on linear channel equalization and are suitable for WCDMA/HSDPA systems using long, orthogonal scrambling codes. Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation practically impossible.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain, and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receives, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

A system and method for implementing a single weight (SW) single channel (SC) MIMO system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for implementing a single weight (SW) single channel (SC) multiple-input multiple-output (MIMO) system. In accordance with an exemplary aspect of the invention, a single weight generator may be utilized with a first portion of a received signal in a first signal-processing path of a MIMO receiver. The single weight generator may be adapted to generate a control signal, or a single weight signal, that may be utilized to control the first portion of the received signal. More specifically, the control signal, or the SW signal, may be utilized within the first signal processing path to adjust a phase and/or amplitude of the first portion of the received signal so that its phase and/or amplitude is equal to a phase and/or amplitude of a second portion of the received signal. The signal weight generator may subsequently update the control signal after a new signal is received by the MIMO receiver.

Figure 1A:
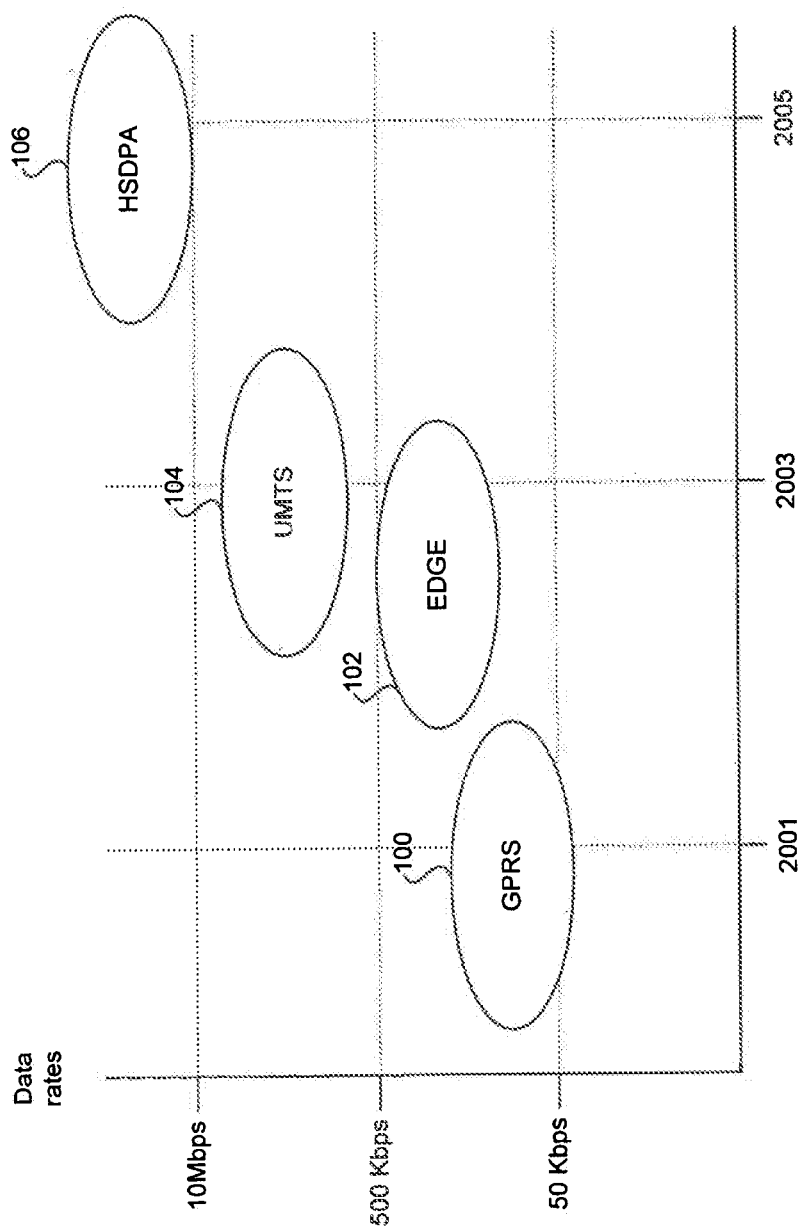
FIG. 1a is a technology timeline indicating evolution of existing WCDMA specification to provide increased downlink throughput.
Figure 1B:
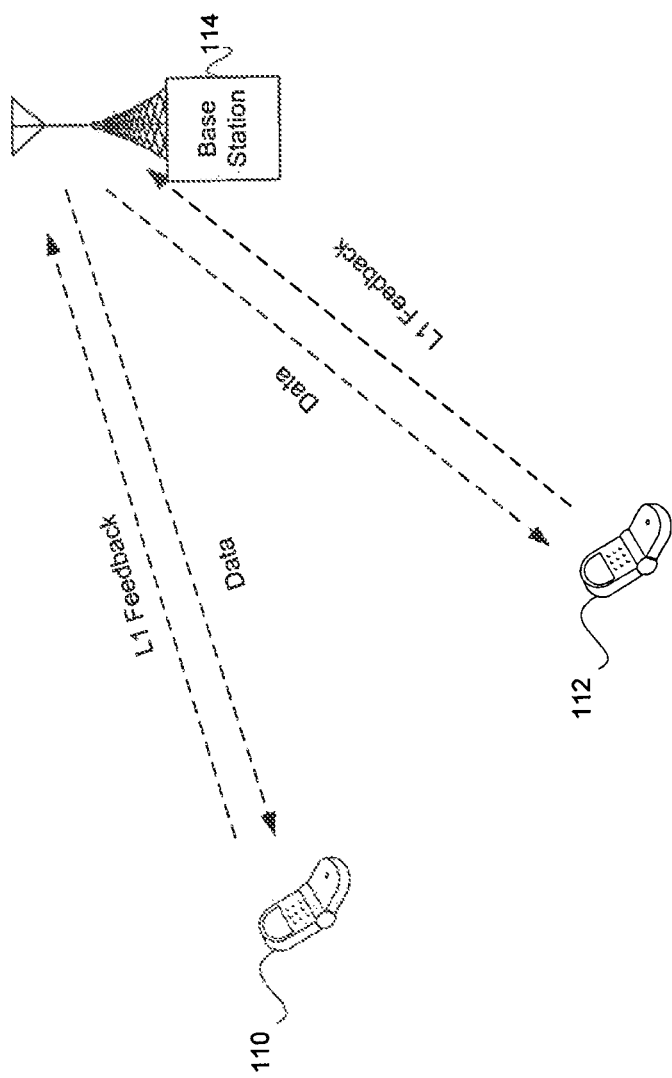
FIG. 1b illustrates an exemplary HSDPA distributed architecture that achieves low delay link adaptation, in connection with an embodiment of the invention.

FIG. 1b illustrates an exemplary HSDPA distributed architecture that achieves low delay link adaptation, in connection with an embodiment of the invention. Referring to FIG. 1b, there is shown terminals 110 and 112 and a base station (BS) 114. HSDPA is built on a distributed architecture that achieves low delay link adaptation by placing key processing at the BS 114 and thus closer to the air interface as illustrated. HSDPA leverages methods that are well established within existing GSM/EDGE standards, including fast physical layer (L1) retransmission combining and link adaptation techniques, to deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control cannot reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
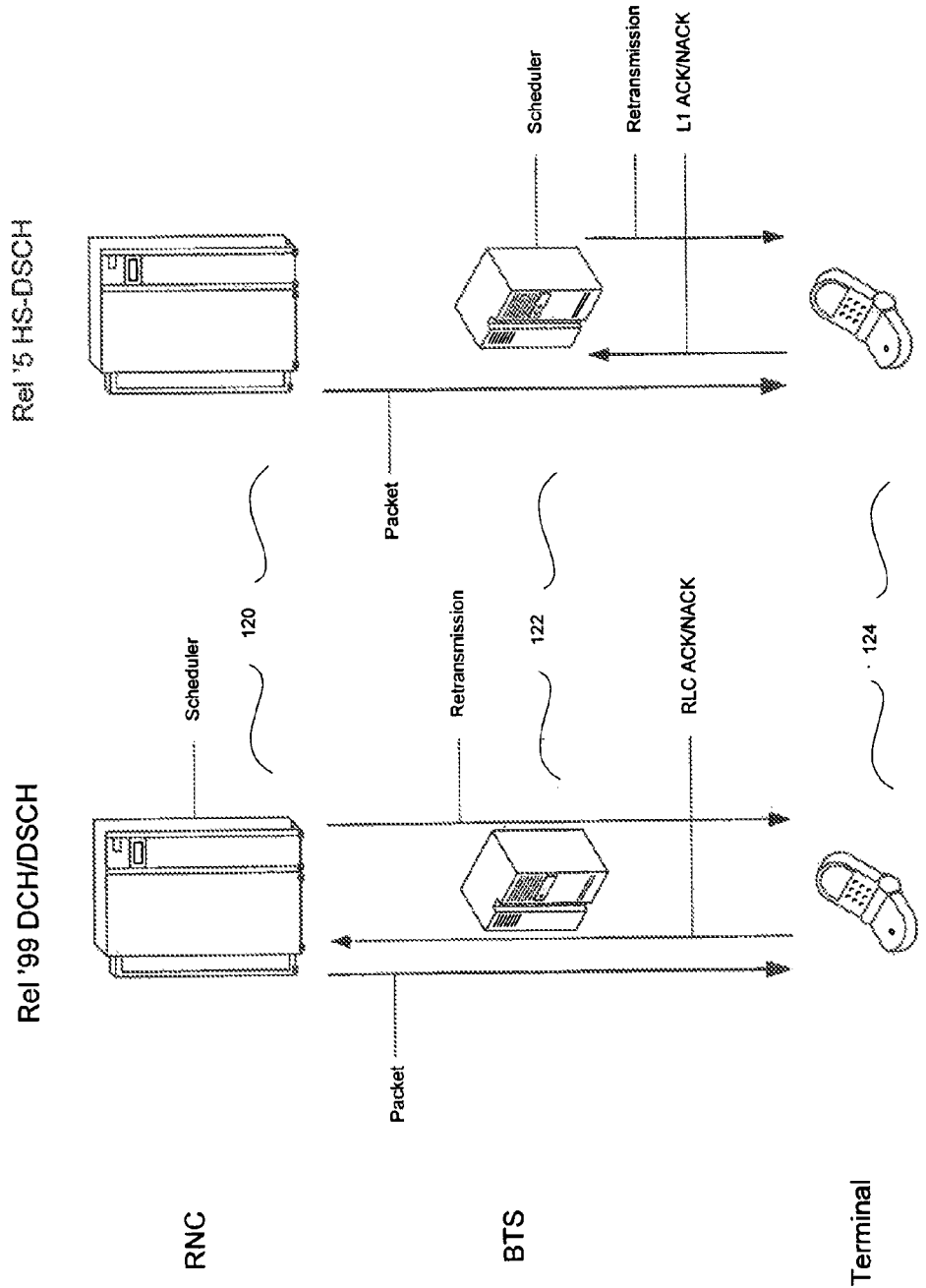
FIG. 1c illustrates an exemplary Layer 1 HARQ control situated in a base station to remove retransmission-related scheduling and storing from the radio network controller, in connection with an embodiment of the invention.

FIG. 1c illustrates an exemplary Layer 1 HARQ control situated in a base station to remove retransmission-related scheduling and storing from the radio network controller, in connection with an embodiment of the invention. Referring to FIG. 1c, there is shown a hybrid automatic repeat request (HARQ) operation, which is an operation designed to reduce the delay and increase the efficiency of retransmissions. Layer 1 HARQ control is situated in the Node B, or base station (BS), 122 thus removing retransmission-related scheduling and storing from the radio network controller (RNC) 120. This HARQ approach avoids hub delay and measurably reduces the resulting retransmission delay.

For example, when a link error occurs, due to signal interference or other causes, a mobile terminal 124 may request the retransmission of the data packets. While current-generation WCDMA networks handle those retransmission requests through the radio network controller 120, HSDPA retransmission requests are managed at the base station 122. Furthermore, received packets are combined at the physical (PHY) layer and retrieved only if successfully decoded. If decoding has failed, the new transmission is combined with the old transmission before channel decoding. The HSDPA approach allows previously transmitted frames (that failed to be decoded) to be combined with the retransmission. This combining strategy provides improved decoding efficiencies and diversity gains while minimizing the need for additional repeat requests.

While the spreading factor may be fixed, the coding rate may vary between ¼ and ¾, and the HSDPA specification supports the use of up to 10 multicodes. More robust coding, fast HARQ, and multi-code operation eliminates the need for variable spreading factor and also allows for more advanced receiver structures in the mobile such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station 122, and thus closer to the air interface, and by using information about channel quality, terminal capabilities, QoS, and power/code availability, HSDPA may achieve more efficient scheduling of data packet transmissions. Moving these intelligent network operations to the base station 122 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 122, HSDPA gathers and utilizes estimates of the channel quality of each active user. This feedback provides current information on a wide range of channel physical layer conditions, including power control, ACK/NACK. ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2-ms interval frame length (also known as time transmit interval), compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may support 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) carries ARQ acknowledgements, downlink quality feedback and other necessary control information on the uplink.

Figure 1D:
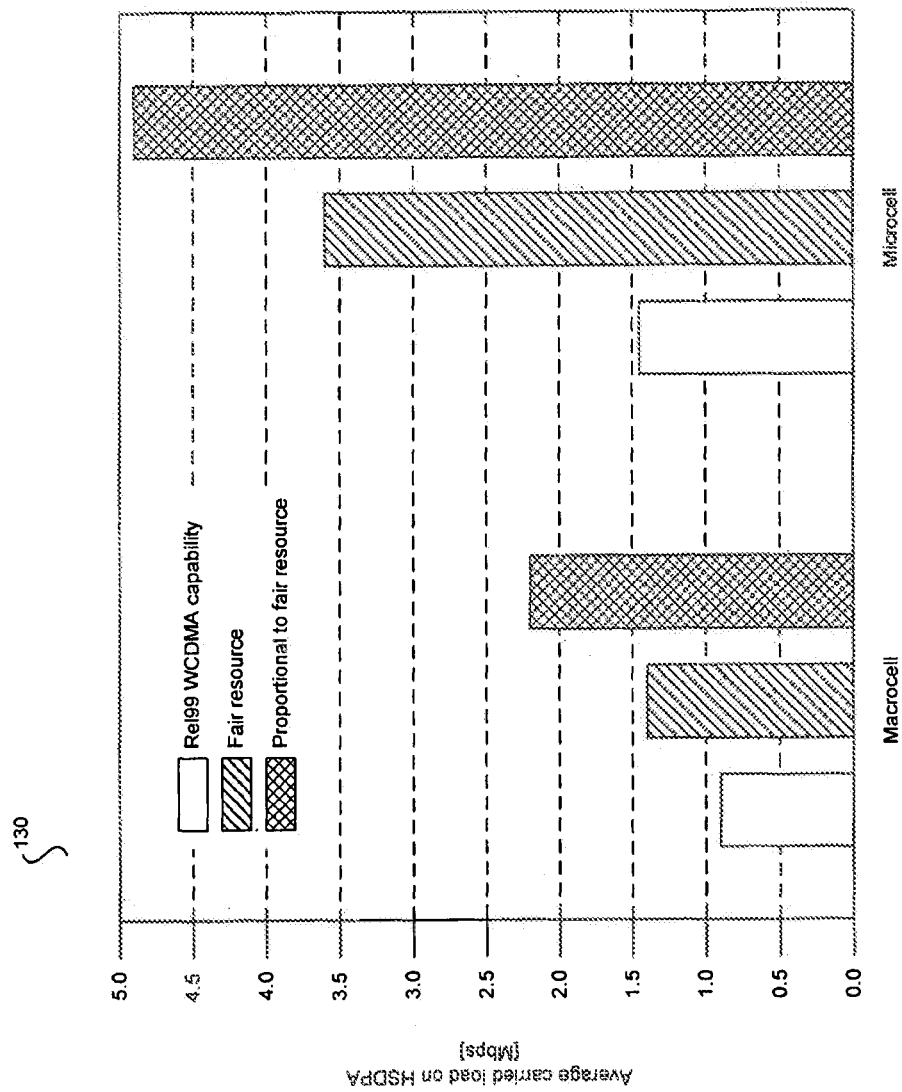
FIG. 1d is a chart illustrating exemplary average carried loads for HSDPA-based macrocell and microcell systems, in connection with an embodiment of the invention.

FIG. 1d is a chart illustrating exemplary average carried loads for HSDPA-based macrocell and microcell systems, in connection with an embodiment of the invention. Referring to chart 130 in FIG. 1d, in practical deployments, HSDPA more than doubles the achievable peak user bit rates compared to WCDMA Release 99. With bit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit/s/Hz/cell.

Figure 2:
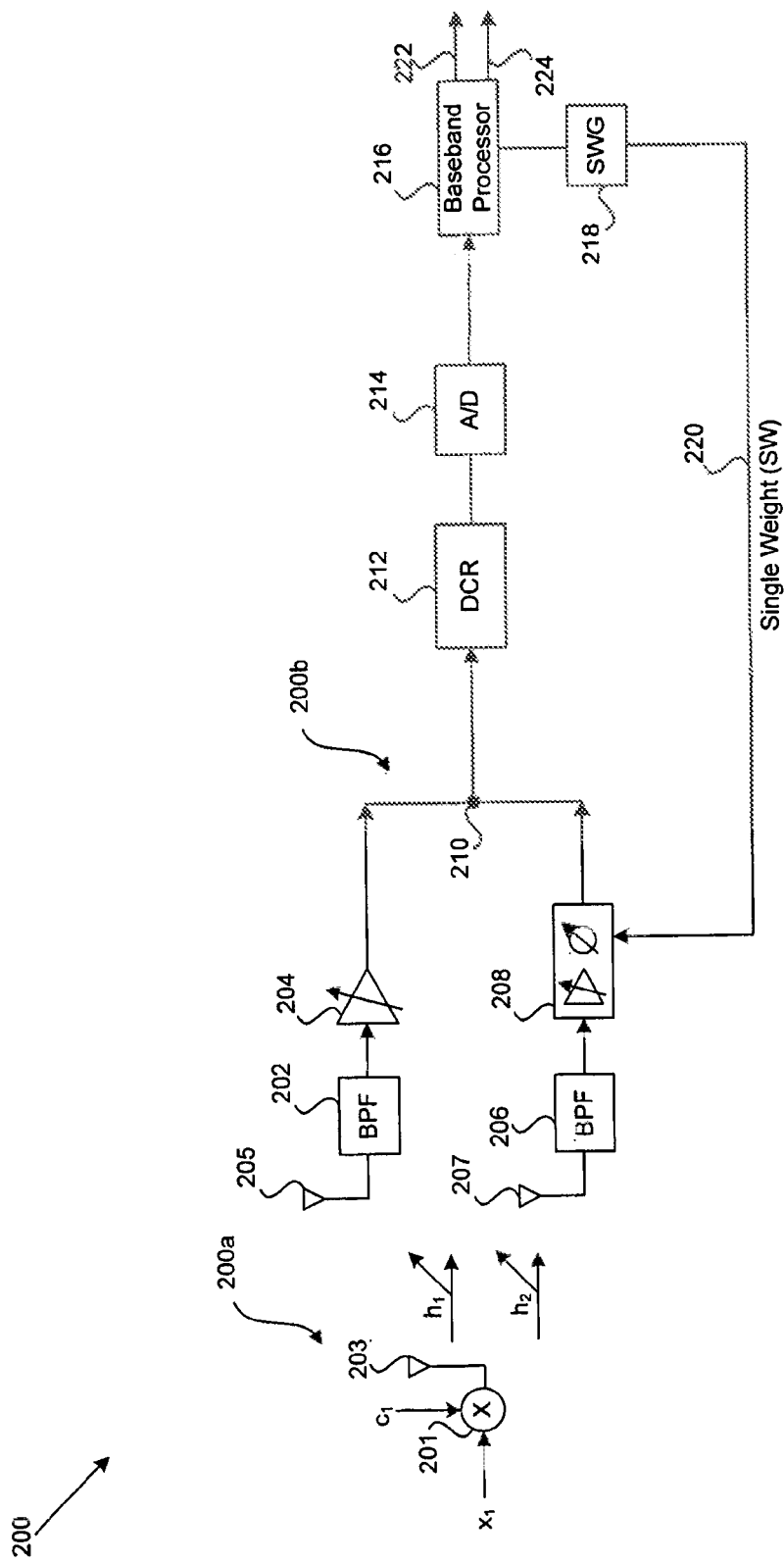
FIG. 2 is a block diagram of an exemplary single weight single channel system for WCDMA, in accordance with an embodiment of the invention.

FIG. 2 is a block diagram of an exemplary single weight single channel system for WCDMA, in accordance with an embodiment of the invention. Referring to FIG. 2, there is shown a transmitter section 200a and a receiver section 200b. The transmitter section 200a may comprise a mixer 201 and antenna 203. Data input $x_1$ and code $c_1$ are inputs to the mixer 201. The receiver section 200b may comprise antennas 205 and 207, bandpass filters (BPF) 202 and 206, low noise amplifier (LNA) 204, phase shifter/LNA (PSLNA) block 208, a direct conversion radio (DCR) block 212, an analog-to-digital (A/D) converter 214, a baseband processor 216, and a single weight generator (SWG) 218.

On the transmit side, the mixer 201 may be adapted to mix the data input $x_1$ with code $c_1$. The actual time varying impulse response of the channel is represented by $h_1$ and $h_2$ per base station. The estimates of the actual time varying impulse response of the channel are represented by $\hat{h}_1$ and $\hat{h}_2$ per base station.

On the receive side, the BPFs 202 and 206 may comprise suitable logic, circuitry, and/or code and may be adapted to receive as an input an RF signal from the antennas 205 and 207, respectively. The BPFs 202 and 206 may then limit the frequencies of the signal to a pre-determined band of frequencies, and output that band of frequencies to the LNA 204 and the PSLNA block 208. The LNA 204 and the PSLNA block 208 may comprise suitable logic, circuitry, and/or code and may be adapted to receive as an input a signal, and amplify the signal while introducing very little additional noise. In addition, the LNA within the PSLNA block 208 may be adapted to receive as an input an amplified signal, shift the phase of the signal, and output a resulting phase-shifted signal.

In one aspect of the invention, the PSLNA block 208 may be utilized to shift the phase of the signal received at antenna 207 so that it is in-phase with the signal received at antenna 205. For example, the PSLNA block 208 may receive a single weight (SW) control signal 220, which may be generated by the single weight generator (SWG) 218. The PSLNA block 208 may then shift the phase of the signal received at antenna 207 based on the received SW control signal 220. In this regard, the two signals received at antennas 205 and 207 may be in phase at point 210. In addition, the LNA within the PSLNA block 208 and the LNA 204 may amplify the respective signals received from antennas 207 and 205 so that balanced gain is achieved for both signals at point 210.

The DCR block 212 may comprise suitable logic, circuitry and/or code and may be adapted to amplify and convert the received analog RF signal down to baseband. For example, the DCR block 212 may utilize a number of amplifier stages implemented with LNAs, a complex in-phase and quadrature signal component mixer, and a low pass channel filter. The A/D converter 214 may comprise suitable logic, circuitry, and/or code that may be adapted to receive an analog signal from the DCR block 212 and generate a corresponding output digital signal, which may be communicated to the baseband processor 216. The digital signal may sample the analog signal at a pre-defined rate.

The baseband processor 216 may comprise suitable logic, circuitry and/or code that may be adapted to process a digital signal and generate a voice output signal 222 and a data output signal 224. In addition, the baseband processor 216 may be adapted to generate output signals that may be utilized by the SWG block 218 for generating the SW 220 for control of the phase shifting in the PSLNA block 208. The voice output signal 222 may be further processed by a voice processing unit and/or a digital display processor, respectively, for example.

The SWG block 218 may comprise suitable circuitry, logic, and/or code and may be adapted to process channel function estimates and RF signal timing information received from the baseband processor 216, for example, and generate a single weight (SW) 220. The SW 220 may be utilized by the PSLNA block 208 to phase-shift an RF signal received at antenna 207 and generate an RF signal that is in-phase with a signal received at antenna 205.

In operation, the transmitter side 200a may be adapted to mix the input data signal $x_1$ with the code signal $c_1$ and then transmitted the signal via antenna 203 over the air. As the signal is transmitted over the air, it may traverse a plurality of different paths or multipaths due to reflections. The actual time varying impulse response of the channel over which the signals travel se is represented by $h_1$ and $h_2$ per base station. The estimates of the actual time varying impulse response of the channel are represented by $\hat{h}_1$ and $\hat{h}_2$ per base station. The transmitted signal may then be received via various paths where actual time varying impulse response of the channel is represented by $h_1$ and $h_2$ per base station. The signal received by the antennas 205 and 207 may be bandpass filtered by BPFs 202 and 206, respectively, and amplified by the LNA 204 and the PSLNA block 208, respectively. In addition, the PSLNA block 208 may receive SW control signal 220 from the SWG block 218 and may adjust the phase of the signal received at antenna 207 based on the SW 220. In this regard, the signal received at antenna 207 may be in-phase with the signal received at antenna 205. In addition, the gains of the two signals received at antennas 205 and 207 may be adjusted so that there may be a gain balance at point 210 in the receiver side 200b.

The RF signal may then be processed by the DCR block 212 and may be further amplified, mixed with a VCO signal, and/or low pass filtered. The RF analog signal processed by the DCR block may be converted to a digital signal by the A/D 214. The digital output of the A/D 214 may be communicated as an input to the baseband processor 216. The baseband processor 216 may further process the input to generate a voice signal 222 and a data signal 224. The voice signal 222 may be further processed, for example, by a voice processing system, and the data signal 224 may be further processed by a display processor, for example. In addition, the baseband processor 216 may be adapted to generate signals that may be utilized by the SWG 218 for generating the signal SW 220.

Even though the transmit side 200a utilizes one antenna 203, the present invention may not be limited in this regard and multiple transmit antennas may be utilized in accordance with various aspects of the invention. Similarly, in accordance with a different aspect of the invention, multiple receive antennas may be utilized on the receive side 200b. In addition, even though phase adjustment techniques utilizing a single weight value on one or more signals is implemented on the receive side 200b, the invention is not so limited. Phase adjustment techniques in accordance with the present invention, utilizing a single weight value on one or more signals may also be implemented on the transmit side 200a.

Figure 3:
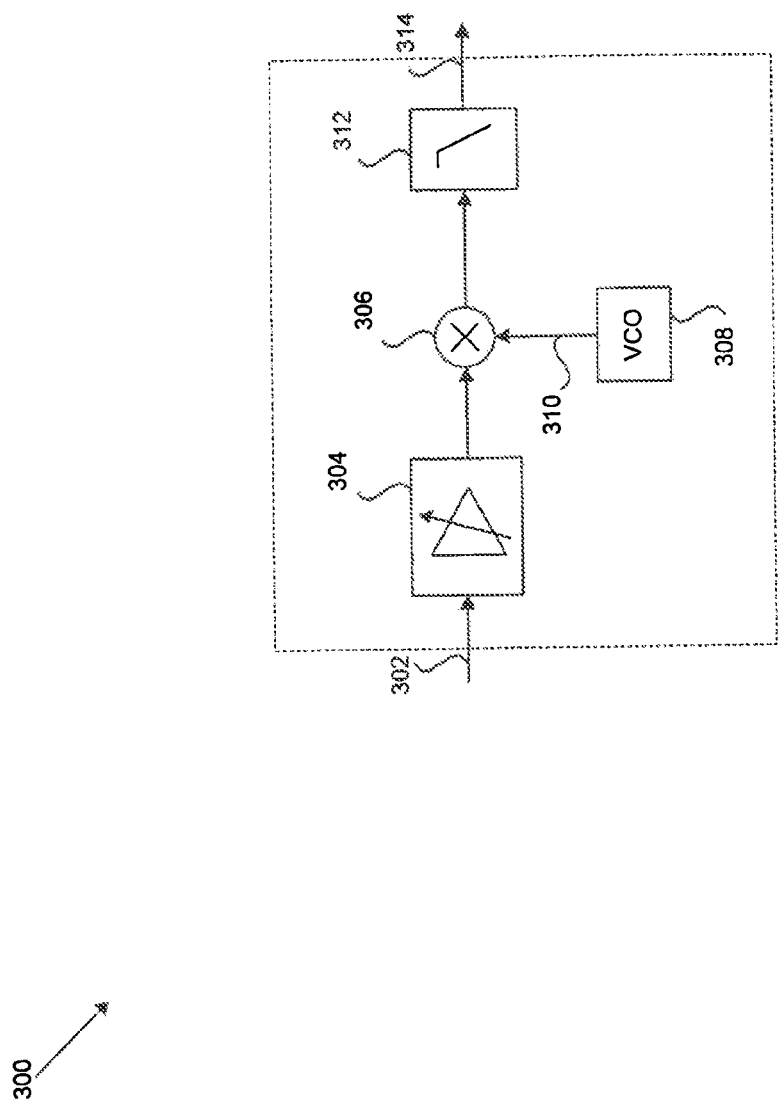
FIG. 3 is a block diagram of a direct conversion radio block that may be utilized in accordance with an aspect of the invention.

FIG. 3 is a block diagram of a direct conversion radio block that may be utilized in accordance with an aspect of the invention. Referring to FIG. 3, the direct conversion radio (DCR) block 300 may comprise suitable logic, circuitry, and/ or code and may be adapted to amplify and convert the received analog RF signal down to baseband. In an exemplary aspect of the invention, the DCR block 300 may comprise an LNA 304, a voltage controlled oscillator (VCO) 308, a mixer 306, and a low pass filter (LPF) 312.

The LNA 304 may receive an RF signal 302 and amplify it based on a determined gain level. The VCO 308 may comprise suitable logic, circuitry and/or code and may be adapted to output a signal of a specific frequency which may be pre-determined, or controlled by a voltage signal input to the VCO. The VCO signal may be mixed by the mixer 306 with the amplified signal received from the LNA 304. The LPF 312 may comprise suitable logic, circuitry and/or code and may be adapted to receive the mixed signal from the mixer 306, limit the frequencies of the mixed signal to a determined range of frequencies up to a certain upper limit frequency, and output that range of frequencies as a baseband signal 314.

Figure 4:
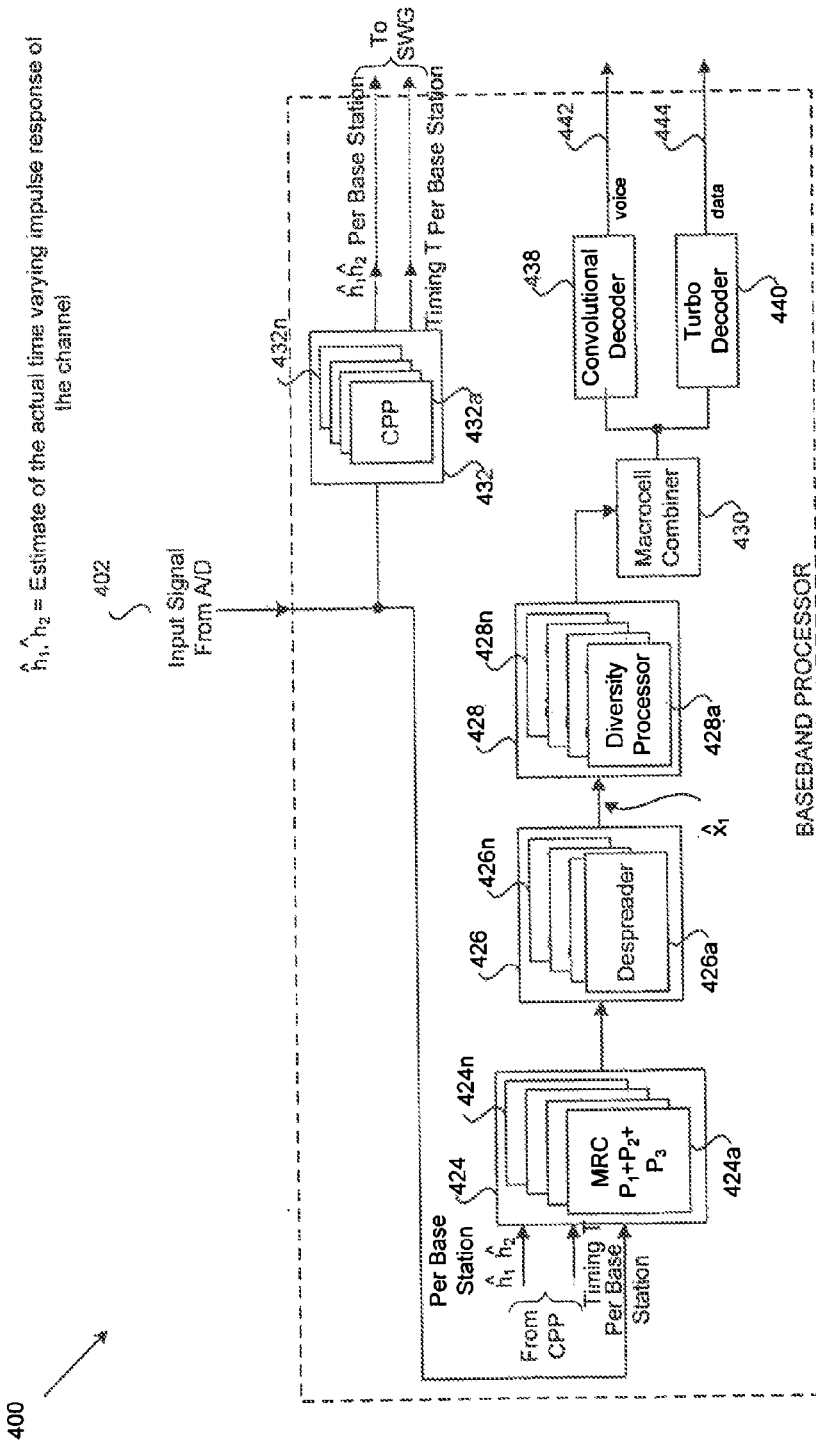
FIG. 4 is a block diagram of an exemplary baseband processor that may be utilized within a MIMO system, in accordance with an aspect of the invention.

FIG. 4 is a block diagram of an exemplary baseband processor that may be utilized within a MIMO system, in accordance with an aspect of the invention. Referring to FIG. 4, the baseband processor 400 may comprise a cluster path processor (CPP) block 432, a maximum ratio combining (MRC) block 424, a despreader block 426, a diversity processor block 428, a macrocell combiner block 430, a convolutional decoder block 438, and a turbo decoder block 440.

U.S. application Ser. No. 11/173,854 provides a detailed description of signal clusters and is hereby incorporated herein by reference in its entirety.

The CPP block 432 may comprise a plurality of cluster processors that may be adapted to receive and process an input signal 402 received from an analog-to-digital converter (A/D), for example. In the baseband receiver processor 400, the CPPs 432a, . . . , 432n within the CPP block 432 may be partitioned into pairs of processors, wherein each pair of processor may be adapted to track time-wise and estimate the complex phase and amplitude of the element in the cluster. A cluster may comprise an aggregate of received multipath signals with maximum (max) time difference that may be no more than 16×⅓.84e6 seconds, for example. Under these circumstances, the need for two processors may be derived from the fact that the WCDMA standard facilitates a receiving mode in which the transmitted signal is transmitted over two antennas, which necessitates the two processors. These receiving modes comprise close loop 1 (CL1), close loop 2 (CL2), and STTD. The CPP block 432 may be adapted to determine estimates of the entire transfer function of the channel and may recover channels on a per base station basis.

The CPP block 432 may be adapted to generate channel estimates $\hat{h}_1$ and $\hat{h}_2$ of the actual time varying impulse response of the channel per base station. The CPP 432 may also generate timing information T on per base station basis related to signals received by antennas at the receive side, such as antennas 205 and 207 of FIG. 2, for example. The channel estimates $\hat{h}_1$ and $\hat{h}_2$ of the actual time varying impulse response of the channel per base station, as well as the timing information T per base station may be communicated to a single weight generation (SWG) block, for example, as well as to the maximum-ratio combining (MRC) block 424 for further processing. The channel estimates $\hat{h}_1$ and $\hat{h}_2$ and the timing information T may be utilized by an SWG block for generating a single weight (SW) control signal for phase shifting of one or more signals received by receiver antennas.

The maximum-ratio combining (MRC) block 424 may comprise a plurality of MRC blocks, namely 424a, . . . , 424n. Timing and estimates of the time varying impulse response of the channel may be provided to the MRC block 424 on a per base station basis. The MRC block 424 may be adapted to provide a simplified and effective combining scheme or mechanism for implementing a RAKE receiver and adaptive antenna arrays to combat noise, fading, and to a certain degree, co-channel interference. In accordance with an embodiment of the invention, each of the MRC blocks 424a, . . . , 424n may comprise suitable logic, circuitry and/or code that may be adapted to add signals from each channel together in such a manner that the gain of each of the channels is proportional to the root mean square (RMS) signal level and inversely proportional to mean square noise level in that channel. Each of the MRC blocks may be adapted to utilize the same proportionality constant for the channels. The MRC block may also be referred to as a ratio-squared combiner, post-detection combiner, pre-detection combiner and/or selective combiner.

The despreader block 426 may comprise a plurality of despreader blocks 426a, . . . , 426n. Each of the despreader blocks 426a, . . . , 426n may comprise suitable logic, circuitry and/or code and may be adapted to remove orthogonal channelization codes, which may have been induced at the transmitter. The despreader block 426 may be adapted to generate local codes, for example code c1, of the transmitted code followed by multiplication and accumulation operations. Processing gain may be realized after completion of integration over a pre-determined number of chips over which the symbol is modulated. Multiple channels may be received in parallel through the use of independent, orthogonal codes.

The diversity processor 428 may comprise a plurality of diversity processors 428a, . . . , 428n, each of which may comprise suitable logic, circuit and/or code that may be adapted to combine signals transmitted from multiple antennas in diversity modes. The diversity modes nay comprise open loop (OL), closed loop 1 (CL1), and closed loop 2 (CL2). In accordance with an embodiment of the invention, the diversity mode signals may be processed in a single hardware block requiring the same received signal inputs from the MRC block 424.

The macrocell combiner 430 may comprise suitable logic, circuit and/or code and may be adapted to achieve macroscopic diversity. The macroscopic diversity scheme may be utilized for combining two or more long-term lognormal signals, which may be obtained via independently fading paths received from two or more different antennas at different base-station sites. The microscopic diversity schemes may be utilized for combining two or more short-term Rayleigh signals, which are obtained via independently fading paths received from two or more different antennas but only one receiving site.

The convolutional decoder 438 may comprise suitable logic, circuitry and/or code that may be utilized to handle decoding of convolutional codes as indicated in the 3GPP specification. The output of the convolutional decoder may be a digital signal, which comprises voice information, suitable for processing by a voice-processing unit. The turbo decoder 440 may comprise suitable logic, circuitry and/or code that may be utilized to handle decoding of turbo codes as indicated in the 3GPP specification. The output of the turbo decode 440 may be a digital signal, which has data information, such that it may be suitable for use by a video display processor.

Referring to FIGS. 2 and 4, in operation, the transmitter side 200a may be adapted to mix the input data signal $x_1$ with the code signal $c_1$ and generate the output signal, which may be transmitted via antenna 203 over different paths over the air. Each over the air path or channel has a corresponding time varying impulse response function $h_1$ and $h_2$. The channel estimates $\hat{h}_1$ and $\hat{h}_2$ provide estimates of the actual time varying impulse response of the channel over which the received signals are transmitted. The signal received by the antennas 205 and 207 may be bandpass filtered by BPFs 202 and 206, respectively, and amplified by the LNA 204 and the PSLNA block 208, respectively. In addition, the PSLNA block 208 may receive SW control signal 220 from the SWG block 218 and may adjust the phase of the signal received at antenna 207 based on the SW 220. In this regard, the signal received at antenna 207 may be in-phase with the signal received at antenna 205. In addition, the gains of the two signals received at antennas 205 and 207 may be adjusted so that there may be a gain balance at point 210 in the receiver side 200b.

The RF signal may then be processed by the DCR block 212 and may be further amplified, mixed with a VCO signal, and/or low pass filtered. The RF analog signal processed by the DCR block may be converted to a digital signal by the A/D 214. The digital output of the A/D 214 may be communicated as an input to the baseband processor 216. The baseband processor 216 may further process the input to generate a voice signal 222 and a data signal 224. The voice signal 222 may be further processed, for example, by a voice processing system or device, and the data signal 224 may be further processed by a display processor, for example. In addition, the baseband processor 216 may be adapted to generate signals that may be utilized by the SWG 218 in generating the signal SW 220.

The digital signal output from the A/D block 214 may be communicated as input signal 402 to the CPP block 432. The CPP block 432 may then generate channel estimates $\hat{h}_1$ and $\hat{h}_2$ of the actual time varying impulse response of the channel per base station, along with timing information T per base station.

The channel estimates $\hat{h}_1$ and $\hat{h}_2$ of the actual time varying impulse response of the channel per base station and/or the timing information T per base station may be communicated to the MRC block 424 for processing. The MRC block 424 may be adapted to utilize the estimates $\hat{h}_1$, $\hat{h}_2$ and timing information T per base station to produce an estimate of the transmitted data.

The despreader block 426 may be adapted to despread the estimated signal per base station so as to generate the original data. The diversity processor block 428 may be adapted to provide diversity processing and the macrocell combiner block 430 may achieve macroscopic diversity. The convolution decoder block 438 may be adapted to execute convolutional decoding on the voice portion of the signal generated from an output of the macrocell combiner block 430 and generate a voice output signal 442. The turbo decoder block 440 may be adapted to execute convolutional decoding on the data portion of the signal generated from an output of the macrocell combiner block 430 and generate a data output signal 444.

Figure 5:
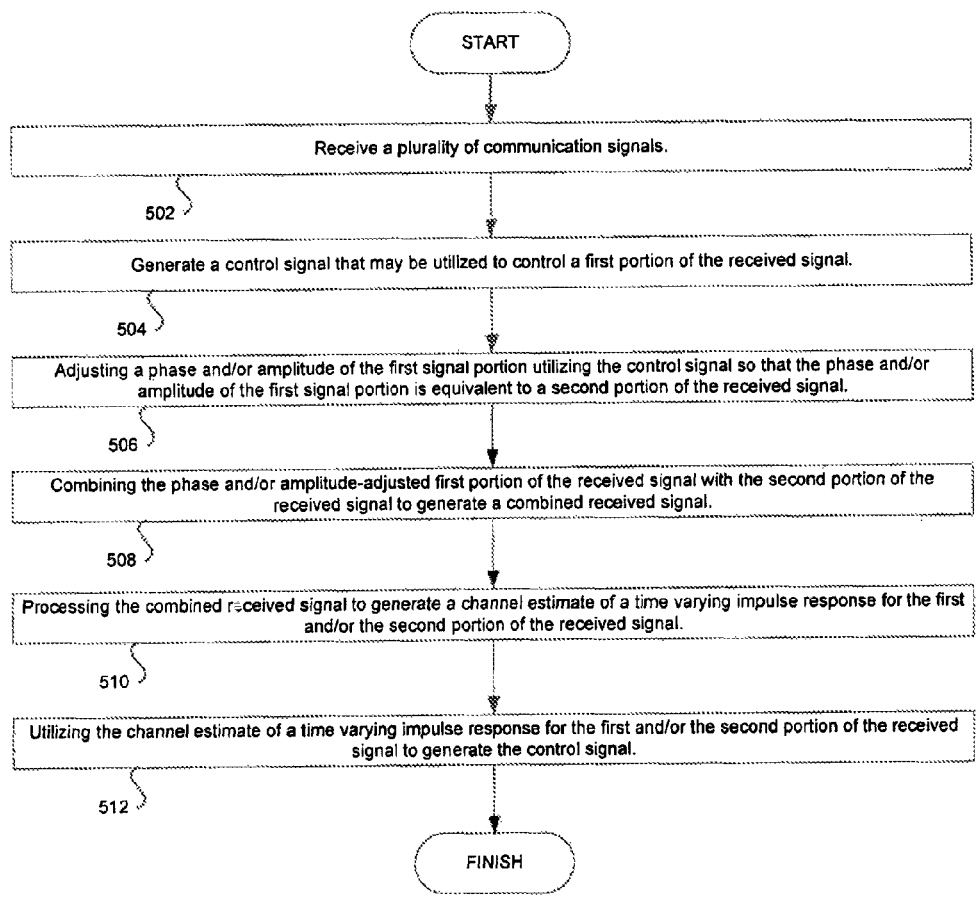
FIG. 5 is a flow diagram illustrating exemplary steps for processing signals in a receiver, in accordance with an embodiment of the invention.

FIG. 5 is a flow diagram illustrating exemplary steps for processing signals in a receiver, in accordance with an embodiment of the invention. Referring to FIG. 5, at 502, a plurality of communication signals may be received in a MIMO receiver. At 504, a control signal may be generated, which may be utilized to control a first portion of the received signal. At 506, a phase and/or amplitude of the first signal portion may be adjusted utilizing the control signal so that the phase and/or amplitude of the first signal portion is equivalent to a second portion of the received signal.

At 508, the phase and/or amplitude-adjusted first portion of the received signal may be combined with the second portion of the received signal to generate a combined received signal. At 510, the combined received signal may be subsequently processed to generate a channel estimate of a time varying impulse response for the first and/or the second portion of the received signal. At 512, the channel estimate of a time varying impulse response for the first and/or the second portion of the received signal may be utilized by a single weight generator to generate the control signal.

Certain embodiments of the invention may be found in a method and system for processing signals in a receiver. Aspects of the method may comprise generating at least one control signal that may be utilized to control a first received signal. A phase of the first received signal may be adjusted via the generated control signal so that the phase of the first received signal may be equivalent to a phase of a second received signal. The phase of the first signal may be adjusted within a processing path used to process the first received signal. An amplitude of the first received signal may be adjusted via the generated control signal so that the amplitude of the first received signal may be equivalent to an amplitude of a second received signal, where the amplitude of the first signal is adjusted within the processing path used to process the first received signal.

The generated control signal may comprise a single weight signal. The phase of the first received signal may be adjusted continuously and/or at discrete intervals. The first received signal may be amplified so that a gain of the first received signal may be equivalent to a gain of the second received signal. The phase-adjusted first received signal may be combined with the second received signals to generate a combined received signal. A channel estimate of a time varying impulse response for the first received signals may be generated and the channel estimate of the time varying impulse response may be utilized to generate a control signal. The control signal may be generated utilizing one or more optimization algorithms, such as a maximum signal-to-noise ratio (SNR) algorithm, a maximum signal-to-interference-and-noise ratio (SINR) algorithm, and/or a minimum bit error rate (BER) algorithm.

Another embodiment of the invention may provide a machine-readable storage, having stored thereon, a computer program having at least one code section executable by a machine, thereby causing the machine to perform the steps as described above for processing signals in a receiver.

Aspects of the system may comprise generating a control signal by a control signal generator, where the control signal may be utilized to control at least a first received signal. A phase and/or an amplitude of the first of the plurality of received signals may be adjusted by a processor via the generated control signal, so that the phase and/or the amplitude of the first received signal may be equivalent to a phase and/or amplitude of a second received signals, where the phase and/or the amplitude of the first signal is adjusted within a processing path used to process the first received signals. The generated control signal may comprise a single weight signal. The phase of the first received signal may be adjusted continuously and/or at discrete intervals. The first received signal may be amplified by an amplifier so that a gain of the first received signal may be equivalent to a gain of the second received signal.

The phase-adjusted first received signals may be combined by a combiner with the second received signal to generate a combined received signal. A channel estimator may be adapted to generate channel estimate of a time varying impulse response for the first received signal. The control signal may be generated by the control signal generator utilizing the channel estimate of the time varying impulse response. The control signal may be generated by the control signal generator utilizing one or more optimization algorithms, such as a maximum signal-to-noise ratio (SNR) algorithm, a maximum signal-to-interference-and-noise ratio (SINR) algorithm, and/or a minimum bit error rate (BER) algorithm.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a receiver, the method comprising:
   receiving a plurality of signals at a phase shifter;
   generating a control signal based on a channel estimate of a time varying impulse response or signal timing information associated with a digitized baseband signal corresponding to a first and a second of said plurality of received signals;
   feeding the generated control signal back to said phase shifter; and
   adjusting, at said phase shifter, a characteristic of said first of said plurality of received signals based on said generated control signal so that said characteristic of said first of said plurality of received signals is substantially equivalent to a characteristic of said second of said plurality of received signals.

2. The method according to claim 1, wherein said characteristic of said first of said plurality of received signals is at least one of a phase and an amplitude of said first of said plurality of received signals, and wherein said characteristic of at least said second of said plurality of received signals is at least one of a phase and an amplitude of at least said second of said plurality of received signals.

3. The method according to claim 1, wherein said generated control signal comprises a single weight signal.

4. The method according to claim 1, wherein said characteristic of said first of said plurality of received signals is adjusted continuously.

5. The method according to claim 1, wherein said characteristic of said first of said plurality of received signals is adjusted at discrete intervals.

6. The method according to claim 1, further comprising amplifying said first of said plurality of received signals so that a gain of said first of said plurality of received signals is equivalent to a gain of at least said second of said plurality of received signals.

7. The method according to claim 1, further comprising combining said adjusted first of said plurality of received signals with at least said second of said plurality of received signals to generate a combined received signal.

8. The method according to claim 1, further comprising generating said channel estimate of said time varying impulse response for said first of said plurality of received signals on a per base station basis.

9. The method according to claim 1, further comprising generating said control signal utilizing an optimization algorithm that comprises one or more of a maximum signal-to-noise ratio (SNR) algorithm, a maximum signal-to-interference-and-noise ratio (SINR) algorithm, or a minimum bit error rate (BER) algorithm.

10. A non-transitory machine-readable storage having stored thereon a code section that when executed by a machine causes the machine to perform steps comprising:
    receiving a plurality of signals at a phase shifter included in the machine;
    generating a control signal based on a channel estimate of a time varying impulse response or signal timing information associated with a digitized baseband signal corresponding to a first and a second of said plurality of received signals;
    feeding the generated control signal back to the phase shifter; and
    adjusting, at said phase shifter, a characteristic of said first of said plurality of received signals based on said generated control signal so that said characteristic of said first of said plurality of received signals is substantially equivalent to a characteristic of said second of said plurality of received signals.

11. The non-transitory machine-readable storage according to claim 10, wherein said characteristic of said first of said plurality of received signals is at least one of a phase and an amplitude of said first of said plurality of received signals, and wherein said characteristic of at least said second of said plurality of received signals is at least one of a phase and an amplitude of at least said second of said plurality of received signals.

12. The non-transitory machine-readable storage according to claim 10, wherein said generated control signal comprises a single weight signal.

13. The non-transitory machine-readable storage according to claim 10, wherein said characteristic of said first of said plurality of received signals is adjusted continuously.

14. The non-transitory machine-readable storage according to claim 10, wherein said characteristic of said first of said plurality of received signals is adjusted at discrete intervals.

15. The non-transitory machine-readable storage according to claim 10, said steps further comprising amplifying said first of said plurality of received signals so that a gain of said first of said plurality of received signals is equivalent to a gain of at least said second of said plurality of received signals.

16. The non-transitory machine-readable storage according to claim 10, said steps further comprising combining said adjusted first of said plurality of received signals with said second of said plurality of received signals to generate a combined received signal.

17. The non-transitory machine-readable storage according to claim 10, said steps further comprising generating said channel estimate of said time varying impulse response for said first of said plurality of received signals on a per base station basis.

18. The non-transitory machine-readable storage according to claim 10, said steps further comprising generating said at least one control signal utilizing at least one optimization algorithm comprising one or more of a maximum signal-to-noise ratio (SNR) algorithm, a maximum signal-to-interference-and-noise ratio (SINR) algorithm, and/or a minimum bit error rate (BER) algorithm.

19. A system for processing signals in a receiver, the system comprising:
    a phase shifter configured to receive a plurality of signals;
    a control signal generator configured to generate a control signal, based on a channel estimate of a time varying impulse response or signal timing information associated with a digitized baseband signal corresponding to a first and a second of said plurality of received signals, wherein the generated control signal is fed back to the phase shifter; and
    at least one processor configured to adjust a characteristic of said first of said plurality of received signals based on said generated control signal so that said characteristic of said first of said plurality of received signals is substantially equivalent to a characteristic of said second of said plurality of received signals.

20. The system according to claim 19, wherein said characteristic of said first of said plurality of received signals is a phase or an amplitude of said first of said plurality of received signals, and wherein said characteristic of at least said second of said plurality of received signals is a phase or amplitude of at least said second of said plurality of received signals.

21. The system according to claim 19, wherein said generated control signal comprises a single weight signal.

22. The system according to claim 19, wherein said characteristic of said first of said plurality of received signals is adjusted continuously.

23. The system according to claim 19, wherein said characteristic of said first of said plurality of received signals is adjusted at discrete intervals.

24. The system according to claim 19, further comprising an amplifier configured to amplify said first of said plurality of received signals so that a gain of said first of said plurality of received signals is equivalent to a gain of at least said second of said plurality of received signals.

25. The system according to claim 19, further comprising a combiner configured to combine said adjusted first of said plurality of received signals with at least said second of said plurality of received signals to generate a combined received signal.

26. The system according to claim 19, further comprising a channel estimator configured to generate said channel estimate of a time varying impulse response for at least said first of said plurality of received signals on a per base station basis.

27. The system according to claim 19, wherein said control signal generator is further configured to generate said control signal utilizing at least one optimization algorithm comprising one or more of a maximum signal-to-noise ratio (SNR) algorithm, a maximum signal-to-interference-and-noise ratio (SINR) algorithm, and a minimum bit error rate (BER) algorithm.

* * * * *